US012669110B2

(12) United States Patent
Liu et al.

(10) Patent No.: US 12,669,110 B2
(45) Date of Patent: Jun. 30, 2026

(54) METHOD AND SYSTEM FOR CALCULATING AERODYNAMIC FORCE OF WIND TURBINE AIRFOIL UNDER DIFFERENT TURBULENCE INTENSITIES

(71) Applicant: SHIJIAZHUANG TIEDAO UNIVERSITY, Shijiazhuang (CN)

(72) Inventors: Qingkuan Liu, Shijiazhuang (CN); Menghao Lv, Shijiazhuang (CN); Yaya Jia, Shijiazhuang (CN); Chao Gao, Shijiazhuang (CN); Huaiyu Zhao, Shijiazhuang (CN); Anjie Chen, Shijiazhuang (CN); Nian Liu, Shijiazhuang (CN)

(73) Assignee: SHIJIAZHUANG TIEDAO UNIVERSITY, Shijiazhuang (CN)

( * ) Notice: Subject to any disclaimer, the term of this patent is extended or adjusted under 35 U.S.C. 154(b) by 1223 days.

(21) Appl. No.: 17/506,560

(22) Filed: Dec. 24, 2021

(65) Prior Publication Data

US 2022/0128038 A1     Apr. 28, 2022

(51) Int. Cl.
*F03D 17/00*       (2016.01)
*G01M 9/08*        (2006.01)
*G06F 113/06*      (2020.01)

(52) U.S. Cl.
CPC .............. *F03D 17/00* (2016.05); *G01M 9/08* (2013.01); *F05B 2260/84* (2013.01);
(Continued)

(58) Field of Classification Search
CPC ...... F03D 17/00; F03D 17/001; F03D 17/002; F03D 17/003; F03D 17/004;
(Continued)

(56) References Cited

U.S. PATENT DOCUMENTS

| | | | | |
|---|---|---|---|---|
| 11,946,451 | B2 * | 4/2024 | Messing | ............... F03D 7/0276 |
| 2006/0257240 | A1 | 11/2006 | Naskali et al. | |
| 2014/0017080 | A1 * | 1/2014 | Porm | ........................ F03D 7/02 |
| | | | | 416/1 |

FOREIGN PATENT DOCUMENTS

| | | |
|---|---|---|
| CN | 101923584 A | 12/2010 |
| CN | 106321347 A | 1/2017 |
| CN | 106777499 A | 5/2017 |

OTHER PUBLICATIONS

Swalwell, Katrina E., John Sheridan, and W. H. Melbourne. "The effect of turbulence intensity on stall of the NACA 0021 aerofoil." In 14th Australasian fluid mechanics conference, pp. 941-944. 2001. (Year: 2001).*

(Continued)

*Primary Examiner* — Kamini S Shah

(74) *Attorney, Agent, or Firm* — Dickinson Wright PLLC

(57)               ABSTRACT

The present disclosure provides a method and system for calculating aerodynamic force of a wind turbine airfoil under different turbulence intensities. The method of the present disclosure includes: calculating a lift coefficient and a drag coefficient according to measured wind pressure, performing function fitting to obtain a fitted lift coefficient model and a fitted drag coefficient model at the different turbulence intensities, and selecting a corresponding fitted lift coefficient model and drag coefficient model according to a turbulence intensity on a wind turbine to be measured, to directly calculate a lift coefficient and a drag coefficient for the aerodynamic force of the airfoil.

3 Claims, 6 Drawing Sheets

(52) U.S. Cl.
  CPC ... *F05B 2270/324* (2013.01); *F05B 2270/331*
    (2013.01); *F05B 2270/336* (2013.01); *G06F*
               *2113/06* (2020.01)

(58) Field of Classification Search
  CPC .. F03D 17/005; F03D 17/006; F03D 17/0065;
      F03D 17/007; F03D 17/008; F03D
      17/009; F03D 17/011; F03D 17/012;
      F03D 17/013; F03D 17/014; F03D
      17/015; F03D 17/016; F03D 17/017;
      F03D 17/018; F03D 17/021; F03D
      17/022; F03D 17/024; F03D 17/025;
      F03D 17/026; F03D 17/027; F03D
      17/028; F03D 17/0285; F03D 17/029;
      F03D 17/031; F03D 17/032; F03D
      17/033; F03D 17/034; F03D 17/036;
      G01M 9/08; F05B 2260/84; F05B
      2270/324; F05B 2270/331; F05B
      2270/336; F05B 2260/83; F05B 2270/70;
      G06F 2113/06; G06F 30/00; G06F 30/17;
      G06F 30/18; G06F 30/20; G06F 30/23;
      G06F 30/30; G06F 30/327; G06F 30/33;
      G06F 30/3312; G06F 30/34; G06F 30/36;
      G06F 30/39; G06F 30/392; G06F 30/394
  See application file for complete search history.

(56)      References Cited

OTHER PUBLICATIONS

International Electrotechnical Commission "International Standard IEC 61400-1. Wind turbines—Part 1: Design Requirements" (2005, IEC). (Year: 2005).*

Yunfei, Zheng, Liu Qingkuan, Ma Wenyong, and Liu Xiaobing. "Effects of end plates on aerodynamic force of rectangular prisms in wind tunnel test." Journal of Experiments in Fluid Mechanics 31, No. 3 (2017): 38-45. (Year: 2017).*

Devenport, W., R. A. Burdisso, H. Camargo, E. Crede, M. Remillieux, M. Rasnick, and P. Van Seeters. "Aeroacoustic testing of wind turbine airfoils." National Renewable Energy Laboratory (NREL), Blacksburg, Virginia (2010). (Year: 2010).*

Pelletier, Alain, and Thomas Mueller. "Low Reynolds No. aerodynamics of low aspect-ratio wings." In 17th Applied Aerodynamics Conference, p. 3182. 1999. (Year: 1999).*

Li, Lin, Zhen Gao, and Torgeir Moan. "Joint environmental data at five european offshore sites for design of combined wind and wave energy devices." In International Conference on Offshore Mechanics and Arctic Engineering, vol. 55423, p. V008T09A006. American Society of Mechanical Engineers, 2013. (Year: 2013).*

Qingkuan, Liu, Shao Qi, Zheng Yunfei, Li Conghui, Ma Wenyong, and Liu Xiaobing. "Experimental study on Reynolds number effect on aerodynamic pressure and forces of cylinder." Journal of Experiments in Fluid Mechanics 30, No. 4 (2016): 7-13. (Year: 2016).*

Denoël, Vincent. "Polynomial approximation of aerodynamic coefficients based on the statistical description of the wind incidence." Probabilistic engineering mechanics 24, No. 2 (2009): 179-189. (Year: 2009).*

Vernardos, Stylianos M. "Aerodynamic calculation of loads and dynamic behavior of wind turbine towers." Master's thesis, (National Technical University of Athens, 2013). (Year: 2013).*

Qu, Hao, Jun Hu, and Xiang Gao. "The impact of Reynolds number on two-dimensional aerodynamic airfoil flow." In 2009 World Non-Grid-Connected Wind Power and Energy Conference, pp. 1-4. IEEE, 2009. (Year: 2009).*

Parkinson, G. V., and N. P. H. Brooks. "On the aeroelastic instability of bluff cylinders." (ASME, 1961): 252-258. Transactions of the ASME. (Year: 1961).*

Lee, B. E. "The effect of turbulence on the surface pressure field of a square prism." Journal of Fluid Mechanics 69, No. 2 (1975): 263-282. (Year: 1975).*

Hoadley, Arthur W. "Conversion of Wing Surface Pressures Into Normalized Lift Coefficient." SAE Transactions (1979): 2001-2008. (Year: 1979).*

* cited by examiner

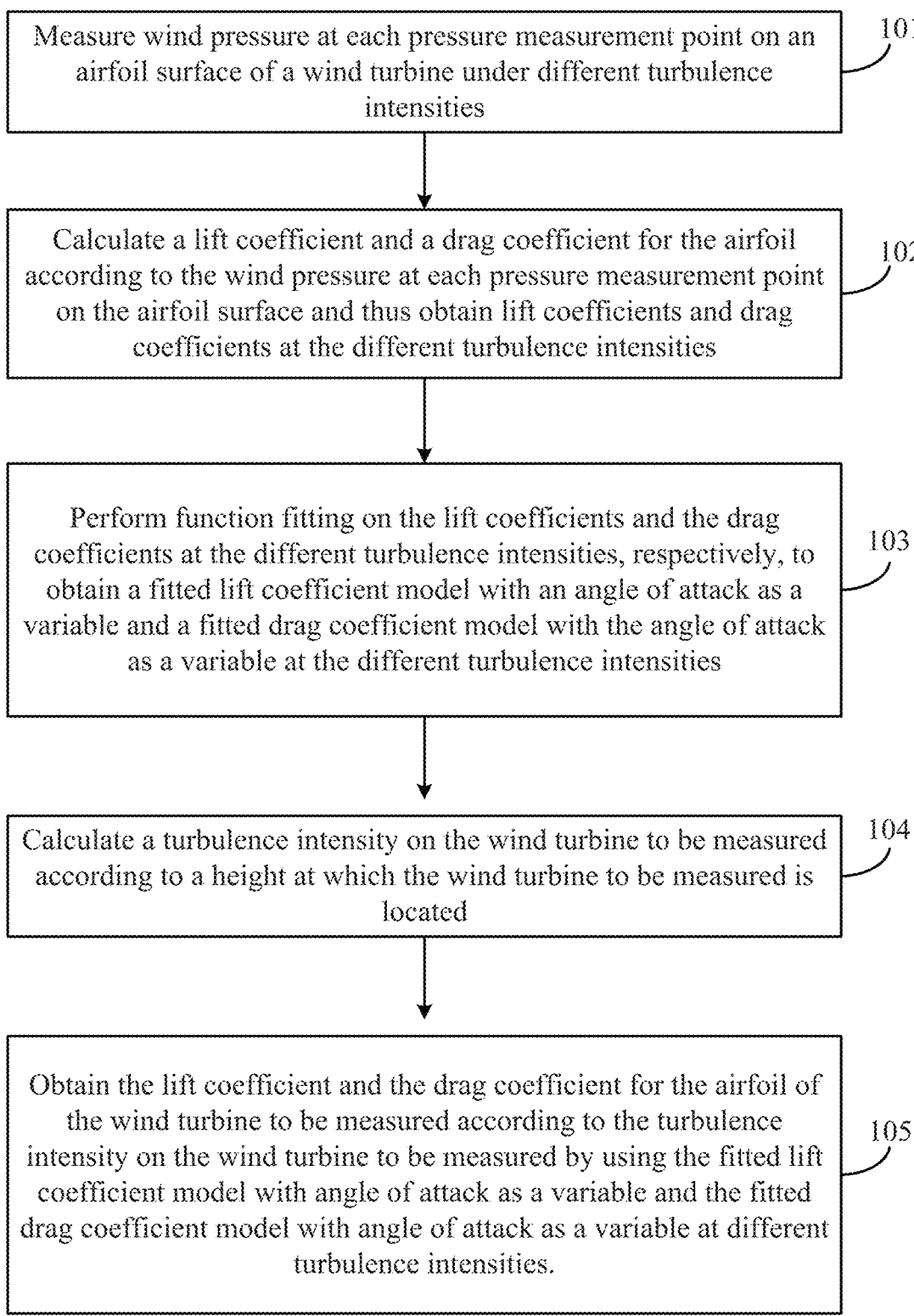

Measure wind pressure at each pressure measurement point on an airfoil surface of a wind turbine under different turbulence intensities — 101

Calculate a lift coefficient and a drag coefficient for the airfoil according to the wind pressure at each pressure measurement point on the airfoil surface and thus obtain lift coefficients and drag coefficients at the different turbulence intensities — 102

Perform function fitting on the lift coefficients and the drag coefficients at the different turbulence intensities, respectively, to obtain a fitted lift coefficient model with an angle of attack as a variable and a fitted drag coefficient model with the angle of attack as a variable at the different turbulence intensities — 103

Calculate a turbulence intensity on the wind turbine to be measured according to a height at which the wind turbine to be measured is located — 104

Obtain the lift coefficient and the drag coefficient for the airfoil of the wind turbine to be measured according to the turbulence intensity on the wind turbine to be measured by using the fitted lift coefficient model with angle of attack as a variable and the fitted drag coefficient model with angle of attack as a variable at different turbulence intensities. — 105

FIG. 1

METHOD AND SYSTEM FOR CALCULATING AERODYNAMIC FORCE OF WIND TURBINE AIRFOIL UNDER DIFFERENT TURBULENCE INTENSITIES

CROSS REFERENCE TO RELATED APPLICATION(S)

This patent application claims the benefit and priority of Chinese Patent Application No. 202011133964.5 filed on Oct. 21, 2020, the disclosure of which is incorporated herein by reference in its entirety.

TECHNICAL FIELD

The present disclosure relates to the technical field of wind turbine design, and in particular, to a method and system for calculating aerodynamic force of a wind turbine airfoil under different turbulence intensities.

BACKGROUND ART

A wind turbine blade is formed with an airfoil, and the aerodynamic performance of the airfoil will have a direct impact on the absorption capability of the wind turbine blade to wind energy, which further influences the power generation efficiency. An inflow turbulence intensity is an important influencing factor for the structural stability and the power generation efficiency of a wind turbine.

In actual operation, the wind turbine is disturbed by natural wind turbulence and the wakes of other turbine generators in a wind farm. Wind turbines in offshore wind farms and mountain wind farms may mostly operate in practice with a turbulence intensity of above 10%, which will not only influence the structural stability of the wind turbines but also result in reduction of power output of the wind turbines. Therefore, it is necessary to give sufficient consideration to the effects of the inflow turbulence intensity on the aerodynamic characteristics of airfoils dedicated for wind turbines when designing the wind turbine blade. Accordingly, how to calculate the aerodynamic force of the wind turbine airfoil under different turbulence intensities has become an urgent technical problem to be solved.

SUMMARY

An objective of the present disclosure is to provide a method and system for calculating aerodynamic force of a wind turbine airfoil under different turbulence intensities, thereby achieving a calculation of the aerodynamic force of the wind turbine airfoil under different turbulence intensities.

To achieve the above objective, the present disclosure provides the following solutions:

A method for calculating aerodynamic force of a wind turbine airfoil under different turbulence intensities includes the following steps:

measuring wind pressure at each pressure measurement point on an airfoil surface of a wind turbine under the different turbulence intensities;

calculating a lift coefficient and a drag coefficient for the airfoil according to the wind pressure at each pressure measurement point on the airfoil surface and thus obtaining lift coefficients and drag coefficients at the different turbulence intensities;

performing function fitting on the lift coefficients and the drag coefficients at the different turbulence intensities, respectively, to obtain a fitted lift coefficient model with an angle of attack as a variable and a fitted drag coefficient model with the angle of attack as a variable at the different turbulence intensities;

calculating a turbulence intensity on the wind turbine to be measured according to a height at which the wind turbine to be measured is located; and obtaining the lift coefficient and the drag coefficient for the airfoil of the wind turbine to be measured according to the turbulence intensity on the wind turbine to be measured by using the fitted lift coefficient model with the angle of attack as the variable and the fitted drag coefficient model with the angle of attack as the variable at the different turbulence intensities.

Alternatively, calculating the lift coefficient and the drag coefficient for the airfoil according to the wind pressure at each pressure measurement point on the airfoil surface and thus obtaining lift coefficients and drag coefficients at different turbulence intensities, may specifically include:

calculating a wind pressure coefficient for each pressure measurement point on the airfoil surface according to the wind pressure at each pressure measurement point on the airfoil surface by using an equation $$C_{pi} = \frac{p_i - p_s}{p_t - p_s},$$

where $C_{pi}$ denotes the wind pressure coefficient for an ith pressure measurement point on the airfoil surface, while $p_i$ denotes the wind pressure at the ith pressure measurement point on the airfoil surface, $p_s$ denotes static pressure, and $p_t$ denotes total wind pressure for all pressure measurement points on the airfoil surface;

calculating the lift coefficient $C_L$ for the airfoil according to the wind pressure coefficient for each pressure measurement point on the airfoil surface by using an equation $$C_L = -\frac{\sum_1^{80} p_i L_i \sin\theta_i}{\frac{1}{2}\rho U_\infty^2 c} = -\sum_1^{80} C p_i L_i \sin\theta_i / c,$$

where $L_i$ denotes an arc length represented by the ith pressure measurement point, while $\theta i$ denotes an included angle between a normal direction of the ith pressure measurement point and an inflow direction, $C_{pi}$ denotes the wind pressure coefficient for the ith pressure measurement point, c denotes a chord length of the airfoil, $\rho$ denotes air density, and $$U_\infty^2$$

denotes a square of a velocity, and 80 is the total number of the pressure measurement points; and calculating the drag coefficient $C_D$ for the airfoil according to the wind pressure coefficient for each pressure measurement point on the airfoil surface by using an equation $$C_D = -\frac{\sum_1^{80} p_i L_i \cos\theta_i}{\frac{1}{2}\rho U_\infty^2 c} = -\sum_1^{80} Cp_i L_i \cos\theta_i / c. \qquad 5$$

Alternatively, performing function fitting on the lift coefficients and the drag coefficients at the different turbulence intensities, respectively, to obtain the fitted lift coefficient model with the angle of attack as the variable and the fitted drag coefficient model with the angle of attack as the variable at the different turbulence intensities, may specifically include:

performing function fitting on the lift coefficients at the different turbulence intensities to obtain the fitted lift coefficient model f(x) with the angle of attack as the variable at the different turbulence intensities: $f(x) = a_1 x^4 + a_2 x^3 + a_3 x^2 + a_4 x + a_5$, where x denotes the angle of attack, and $a_1$, $a_2$, $a_3$, $a_4$ and $a_5$ are a first fitting parameter, a second fitting parameter, a third fitting parameter, a fourth fitting parameter and a fifth fitting parameter of the fitted lift coefficient model, respectively; and performing function fitting on the drag coefficients at the different turbulence intensities to obtain the fitted drag coefficient model f'(x) with the angle of attack as the variable at the different turbulence intensities:

$$f'(x) = b_1 x^9 + b_2 x^8 + b_3 x^7 + b_4 x^6 + b_5 x^5 + b_6 x^4 + b_7 x^3 + b_8 x^2 + b_9 x + b_{10},$$

where $b_1$, $b_2$, $b_3$, $b_4$, $b_5$, $b_6$, $b_7$, $b_8$, $b_9$ and $b_{10}$ are a first fitting parameter, a second fitting parameter, a third fitting parameter, a fourth fitting parameter, a fifth fitting parameter, a sixth fitting parameter, a seventh fitting parameter, an eighth fitting parameter, a ninth fitting parameter and a tenth fitting parameter of the fitted drag coefficient model, respectively.

Alternatively, calculating the turbulence intensity on the wind turbine to be measured according to the height at which the wind turbine to be measured is located, may specifically include:

calculating a turbulence intensity on the wind turbine to be measured according to the height at which the wind turbine to be measured is located by using an equation $I_z(z) = I_{10} \overline{I}_z(z)$, where $\overline{I}_z(z)$ denotes a turbulence intensity proportionality coefficient, $$\overline{I}_z(z) = \left(\frac{z}{10}\right)^{-\alpha}, \qquad 55$$

while z denotes the height at which the wind turbine is located, α denotes a ground roughness exponent, and $I_{10}$ denotes a nominal turbulence intensity at a height of 10 m.

A system for calculating aerodynamic force of a wind turbine airfoil under the different turbulence intensities includes:

a wind pressure measuring module configured to measure wind pressure at each pressure measurement point on an airfoil surface of a wind turbine under the different turbulence intensities;

a lift coefficient and drag coefficient calculating module configured to calculate a lift coefficient and a drag coefficient for the airfoil according to the wind pressure at each pressure measurement point on the airfoil surface and thus obtain lift coefficients and drag coefficients at the different turbulence intensities;

a function fitting module configured to perform function fitting on the lift coefficients and the drag coefficients at the different turbulence intensities, respectively, thereby obtaining a fitted lift coefficient model with an angle of attack as a variable and a fitted drag coefficient model with the angle of attack as a variable at the different turbulence intensities;

A turbulence intensity calculating module configured to calculate a turbulence intensity on a wind turbine to be measured according to a height at which the wind turbine to be measured is located; and a lift coefficient and drag coefficient fitting obtaining module configured to obtain the lift coefficient and the drag coefficient for the airfoil of the wind turbine to be measured according to the turbulence intensity on the wind turbine to be measured by using the fitted lift coefficient model with the angle of attack as the variable and the fitted drag coefficient model with the angle of attack as the variable at the different turbulence intensities.

Alternatively, the lift coefficient and drag coefficient calculating module may specifically include:

a wind pressure coefficient calculating submodule configured to calculate a wind pressure coefficient for each pressure measurement point on the airfoil surface according to the wind pressure at each pressure measurement point on the airfoil surface by using an equation $$C_{pi} = \frac{p_i - p_s}{p_t - p_s},$$

where $C_{pi}$ denotes the wind pressure coefficient for an ith pressure measurement point on the airfoil surface, $p_i$ denotes the wind pressure at the ith pressure measurement point on the airfoil surface, $p_s$ denotes static pressure, and $p_t$ denotes total wind pressure for all pressure measurement points on the airfoil surface;

a lift coefficient calculating submodule configured to calculate the lift coefficient $C_L$ for the airfoil according to the wind pressure coefficient for each pressure measurement point on the airfoil surface by using an equation $$C_L = -\frac{\sum_1^{80} p_i L_i \sin\theta_i}{\frac{1}{2}\rho U_\infty^2 c} = -\sum_1^{80} Cp_i L_i \sin\theta_i / c,$$

where Li denotes an arc length represented by the ith pressure measurement point, $\theta_i$ denotes an included angle between a normal direction of the ith pressure measurement point and an inflow direction, $C_{pi}$ denotes the wind pressure coefficient for the ith pressure measurement point, c a chord length of the airfoil, ρ denotes air density, and $$U_\infty^2$$

denotes a square of a velocity; and 80 is the total number of the pressure measurement points; and a drag coefficient calculating submodule configured to calculate the drag coefficient $C_D$ for the airfoil according to the wind pressure coefficient for each pressure measurement point on the airfoil surface by using an equation $$C_D = -\frac{\sum_1^{80} p_i L_i \cos\theta_i}{\frac{1}{2}\rho U_\infty^2 c} = -\sum_1^{80} C p_i L_i \cos\theta_i / c,$$

Alternatively, the function fitting module may specifically include:

a fitted lift coefficient model obtaining module configured to perform function fitting on the lift coefficients at the different turbulence intensities to obtain the fitted lift coefficient model f(x) with the angle of attack as the variable at the different turbulence intensities:

$$f(x) = a_1 x^4 + a_2 x^3 + a_3 x^2 + a_4 x + a_5,$$

where x denotes the angle of attack, and $a_1$, $a_2$, $a_3$, $a_4$ and $a_5$ are a first fitting parameter, a second fitting parameter, a third fitting parameter, a fourth fitting parameter and a fifth fitting parameter of the fitted lift coefficient model, respectively; and a fitted drag coefficient model obtaining module configured to perform function fitting on the drag coefficients at the different turbulence intensities to obtain the fitted drag coefficient model f'(x) with the angle of attack as the variable at the different turbulence intensities:

$$f'(x) = b_1 x^9 + b_2 x^8 + b_3 x^7 + b_4 x^6 + b_5 x^5 + b_6 x^4 + b_7 x^3 + b_8 x^2 + b_9 x + b_{10},$$

where $b_1$, $b_2$, $b_3$, $b_4$, $b_5$, $b_6$, $b_7$, $b_8$, $b_9$ and $b_{10}$ are a first fitting parameter, a second fitting parameter, a third fitting parameter, a fourth fitting parameter, a fifth fitting parameter, a sixth fitting parameter, a seventh fitting parameter, an eighth fitting parameter, a ninth fitting parameter and a tenth fitting parameter of the fitted drag coefficient model, respectively.

Alternatively, the turbulence intensity calculating modules may specifically include:

a turbulence intensity calculating submodule configured to calculate a turbulence intensity on the wind turbine to be measured according to the height at which the wind turbine to be measured is located by using an equation $I_z(z) = I_{10} \bar{I}_z(z)$, where $\bar{I}_z(z)$ denotes a turbulence intensity proportionality coefficient, $$\bar{I}_z(z) = \left(\frac{z}{10}\right)^{-\alpha},$$

while z denotes the height at which the wind turbine is located, α denotes a ground roughness exponent, and $I_{10}$ denotes a nominal turbulence intensity at a height of 10 m.

Based on specific embodiments provided herein, the present disclosure has the following technical effects:

The present disclosure provides a method and system for calculating aerodynamic force of a wind turbine airfoil under different turbulence intensities. The method includes the following steps: measuring wind pressure at each pressure measurement point on an airfoil surface of a wind turbine under different turbulence intensities; calculating a lift coefficient and a drag coefficient for the airfoil according to the wind pressure at each pressure measurement point on the airfoil surface and thus obtaining lift coefficients and drag coefficients at the different turbulence intensities; performing function fitting on the lift coefficients at different turbulence intensities and the drag coefficients at different turbulence intensities, respectively, thereby obtaining a fitted lift coefficient model with an angle of attack as a variable and a fitted drag coefficient model with the angle of attack as a variable at different turbulence intensities; calculating a turbulence intensity on the wind turbine to be measured according to a height at which the wind turbine to be measured is located; and obtaining the lift coefficient and the drag coefficient for an airfoil of the wind turbine to be measured according to the turbulence intensity on the wind turbine to be measured by using the fitted lift coefficient model with the angle of attack as the variable and the fitted drag coefficient model with the angle of attack as the variable at different turbulence intensities. According to the present disclosure, the lift coefficient and drag coefficient are calculated according to measured wind pressure, function fitting are performed to obtain a fitted lift coefficient model and a fitted drag coefficient model at different turbulence intensities, and the corresponding fitted lift coefficient model and drag coefficient model are selected according to the turbulence intensity on the wind turbine to be measured, to directly calculate the lift coefficient and the drag coefficient for the aerodynamic force of the airfoil.

BRIEF DESCRIPTION OF THE DRAWINGS

To describe the technical solutions in embodiments of the present disclosure or in the prior art more clearly, the accompanying drawings required in the embodiments will be briefly described below. Apparently, the accompanying drawings in the following description show merely some embodiments of the present disclosure, and other drawings can be derived from these accompanying drawings by those of ordinary skill in the art without creative efforts.

FIG. 1 is a flowchart of a method for calculating aerodynamic force of a wind turbine airfoil under different turbulence intensities provided in the present disclosure;

7

DETAILED DESCRIPTION OF THE EMBODIMENTS

An objective of the present disclosure is to provide a method and system for calculating aerodynamic force of a wind turbine airfoil under different turbulence intensities, thereby calculating aerodynamic force of the wind turbine airfoil under the different turbulence intensities.

To make the foregoing objective, features, and advantages of the present disclosure clearer and more comprehensible, the present disclosure will be further described below in detail in conjunction with the accompanying drawings and specific embodiments.

As shown in FIG. 1, the present disclosure provides a method for calculating aerodynamic force of a wind turbine airfoil under the different turbulence intensities. The method includes steps 101-105:

In step 101, wind pressure at each pressure measurement point on an airfoil surface of a wind turbine is measured under the different turbulence intensities.

Inflow turbulence intensity may have a significant impact on lift and drag coefficients for the airfoil. The turbulence intensity $I\mu$ is a flow condition of a fluid. When the flow velocity increases tremendously, streamlines may no longer be clear and numerous small vortexes occur in the flow field, leading to breakage of laminar flow, and sliding and mixing between adjacent flow layers, which finally result in turbulence. Since wind turbines studied herein are applied to some mountainous areas of geomorphic type B, a turbulence intensity distribution along a height is calculated according to the following equations:

$$I_Z(z) = I_{10}\overline{I}_z(z) \tag{1}$$

$$\overline{I}_z(z) = \left(\frac{z}{10}\right)^{-\alpha} \tag{2}$$

where $\alpha$ denotes a ground roughness exponent, which is set to 0.12, 0.15, 0.22 and 0.30 corresponding to A, B, C and D, respectively; and $I_{10}$ denotes a nominal turbulence intensity at a height of 10 m, which can be 0.12, 0.14, 0.23, 0.39 corresponding to ground roughness of the geomorphic types A, B, C and D, respectively.

Turbulence intensities at different heights are calculated according to the equations, as shown in Table 1:

TABLE 1

| Turbulence Intensities at Different Heights with Respect to Geomorphic Type B | | | | | |
|---|---|---|---|---|---|
| Height Above the Ground/m | 25 | 50 | 75 | 100 | 125 150 |
| Turbulence Intensity/% | 12.2 | 11 | 10.3 | 9.9 | 9.6 9.3 |

Turbulence intensities in typhoon wind field are found to be basically less than or equal to that specified in Load Code for the Design of Building Structures.

Figure 2:
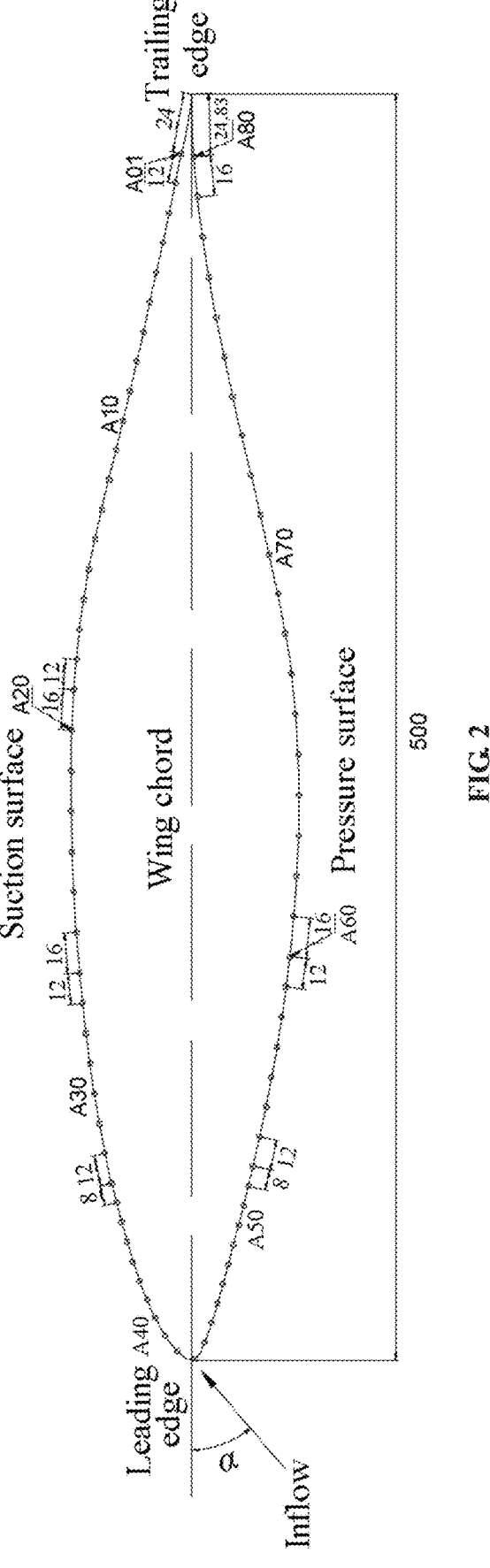
FIG. 2 is a distribution diagram of measurement points on NREL S810 airfoil according to an embodiment of the present disclosure.

Specific parameters: NREL S810 airfoil segment model is designed and made with ABS plates, with a model chord length c of 50 cm and a total of 80 pressure measurement points, as shown in FIG. 2.

With the requirement of a test turbulence intensity range covering the actual turbulence intensity environment of the airfoil, a maximum test turbulence intensity is chosen to be 13.0%>12.2%. Other turbulence intensity conditions are increased continuously from uniform flow with a turbulence intensity (less than 0.4) in wind tunnels, to 2.3%, 4.6%, 8.5%, 11.0% and 13.0%, respectively. Wind tunnel pressure measuring tests are conducted in a low-velocity test section of STU-1 wind tunnel to measure the wind pressure acting on the surface of the model, and aerodynamic force acting on the model can be obtained by using an integration method.

In step 102, a lift coefficient and a drag coefficient for the airfoil are calculated according to the wind pressure at each pressure measurement point on the airfoil surface, and lift coefficients and drag coefficients at the different turbulence intensities are thus obtained.

The step 102 of calculating the lift coefficient and the drag coefficient for the airfoil according to the wind pressure at each pressure measurement point on the airfoil surface and thus obtaining lift coefficients and drag coefficients at the different turbulence intensities, specifically includes:

Calculating a wind pressure coefficient for each pressure measurement point on the airfoil surface according to the wind pressure at each pressure measurement point on the airfoil surface by using an equation $$C_{pi} = \frac{p_i - p_s}{p_t - p_s},$$

where $C_{pi}$ denotes the wind pressure coefficient for an ith pressure measurement point on the airfoil surface, $p_i$ denotes the wind pressure at the ith pressure measurement point on the airfoil surface, $p_s$ denotes static pressure, and $p_t$ denotes total wind pressure for all pressure measurement points on the airfoil surface;

Calculating a lift coefficient $C_L$ for the airfoil according to the wind pressure coefficient for each pressure measurement point on the airfoil surface by using an equation $$C_L = -\frac{\sum_1^{80} p_i L_i \sin\theta_i}{\frac{1}{2}\rho U_\infty^2 c} = -\sum_1^{80} Cp_i L_i \sin\theta_i / c,$$

where $L_i$ denotes an arc length represented by the ith pressure measurement point, $\theta_i$ denotes an included angle between a normal direction of the ith pressure measurement point and an inflow direction, $C_{pi}$ denotes the wind pressure coefficient for the ith pressure measurement point, c denotes a chord length of the airfoil, $\rho$ denotes air density, $$U_\infty^2$$

denotes a square of a velocity, and 80 is the total number of the pressure measurement points; and Calculating the drag coefficient $C_D$ for the airfoil according to the wind pressure coefficient for each pressure measurement point on the airfoil surface by using an equation $$C_D = -\frac{\sum_1^{80} p_i L_i \cos\theta_i}{\frac{1}{2}\rho U_\infty^2 c} = -\sum_1^{80} Cp_i L_i \cos\theta_i / c.$$

In step 103, function fitting is performed on the lift coefficients and the drag coefficients at the different turbulence intensities, respectively, thereby obtaining a fitted lift coefficient model with an angle of attack as a variable and a fitted drag coefficient model with the angle of attack as a variable at the different turbulence intensities.

With the tests, it is shown that under low Reynolds numbers, the lift coefficient for the airfoil exhibits the same variation trend with the angle of attack at varied turbulence intensities, i.e., increasing linearly first with the angle of attack increasing, and decreasing sharply when the angle of attack of wind increases to a certain angle, resulting in an airfoil stall. However, values of the angle of attack of wind when the lift coefficient starts to decrease may be different under the different turbulence intensities, and the maximum lift coefficients may also be different. The variation curves of lift and drag of NREL S810 airfoil are as shown in FIG. 3 and FIG. 4.

Figure 3:
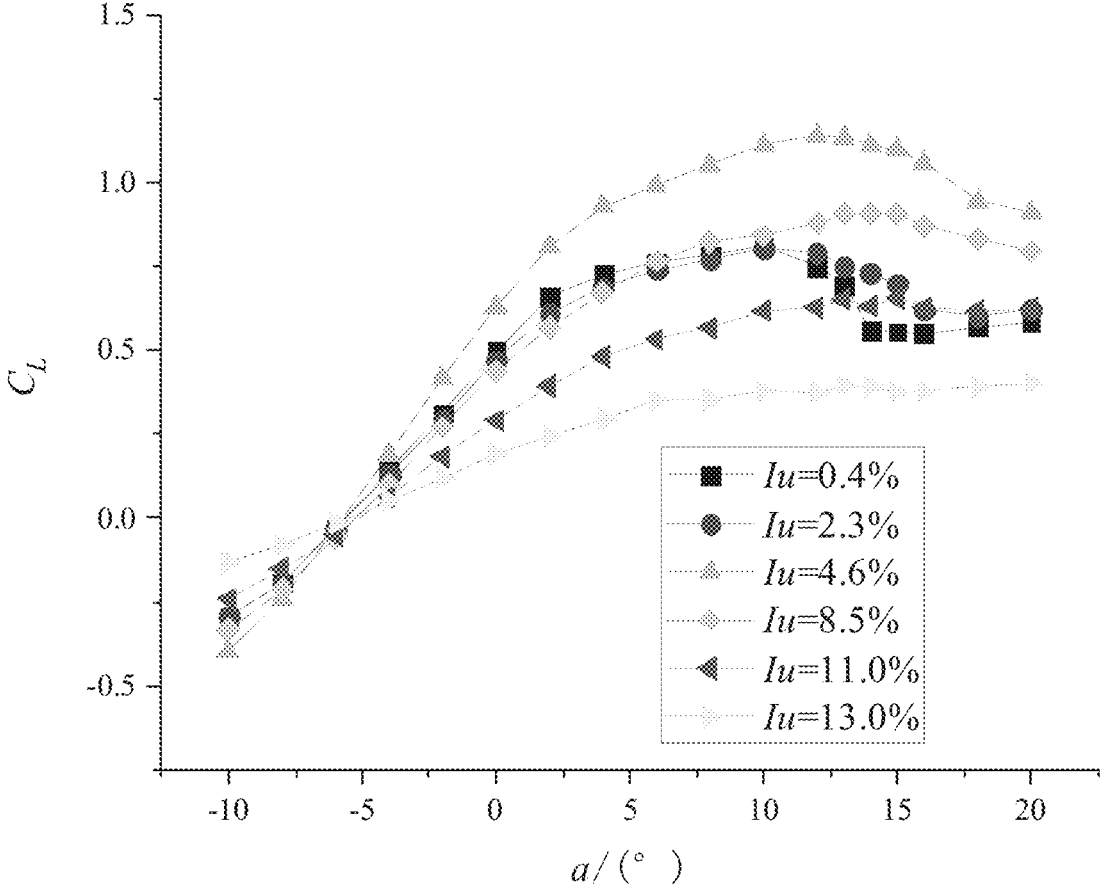
FIG. 3 is a curve chart of lift coefficients according to an embodiment of the present disclosure.
Figure 4:
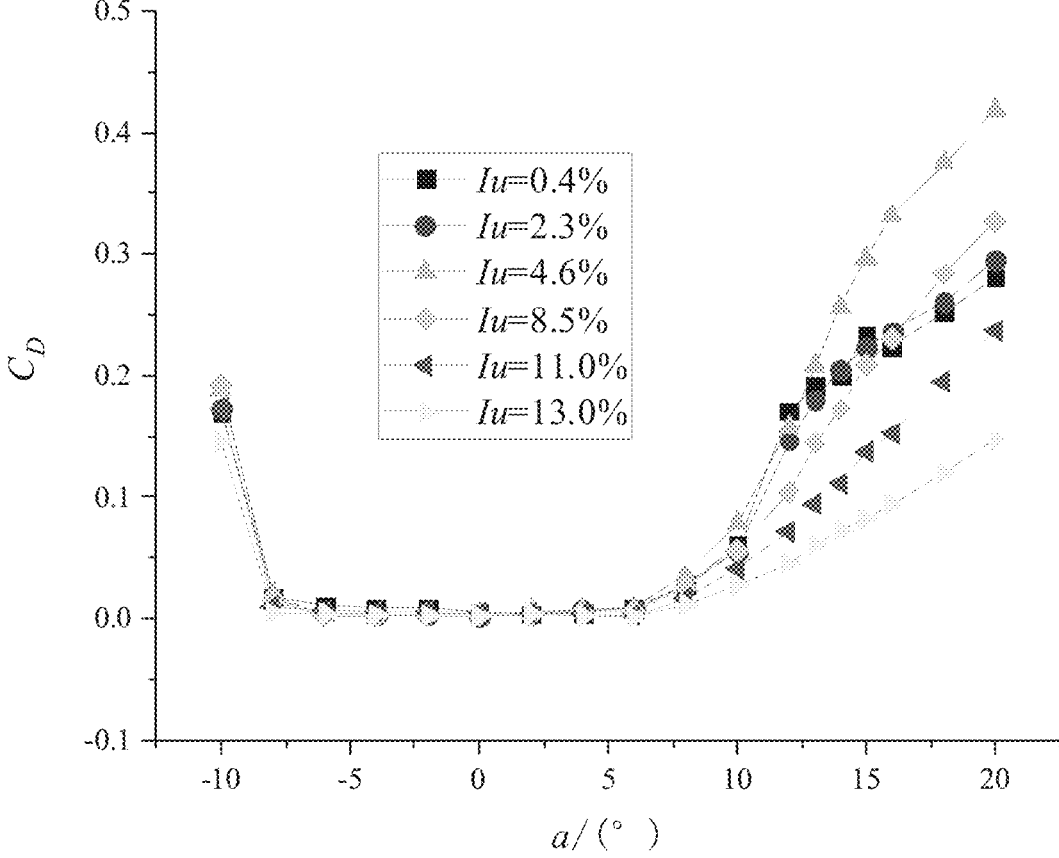
FIG. 4 is a curve chart of drag coefficients according to an embodiment of the present disclosure.

The lift coefficients for the airfoil at the different turbulence intensities in FIG. 3 are fitted to obtain the fitted lift coefficient model f(x) with the angle of attack as the variable at the different turbulence intensities: $f(x) = a_1 x^4 + a_2 x^3 + a_3 x^2 + a_4 x + a_5$.

Values of the fitting parameters of the fitted lift coefficient model are listed in Table 2.

TABLE 2

| | | | | | | |
|---|---|---|---|---|---|---|
| Fitting Parameters of Fitted Lift Coefficient Model | | | | | | |
| Turbulence Intensity | Uniform Flow | 2.3% | 4.6% | 8.5% | 11.0% | 13.0% |
| $a_1$ | $1.42092 \times 10^{-5}$ | $8.77467 \times 10^{-6}$ | $5.25005 \times 10^{-6}$ | $3.53501 \times 10^{-6}$ | $3.40697 \times 10^{-6}$ | $2.88135 \times 10^{-6}$ |
| $a_2$ | $-2.70772 \times 10^{-4}$ | $-1.91814 \times 10^{-4}$ | $-1.46843 \times 10^{-4}$ | $-1.0832 \times 10^{-4}$ | $-8.82661 \times 10^{-5}$ | $-6.24848 \times 10^{-5}$ |
| $a_3$ | $-4.04 \times 10^{-3}$ | $-2.98 \times 10^{-3}$ | $-0.3 \times 10^{-2}$ | $-1.89 \times 10^{-3}$ | $-1.35 \times 10^{-3}$ | $-9.54731 \times 10^{-4}$ |
| $a_4$ | 0.07957 | 0.07347 | 0.09187 | 0.07181 | 0.05186 | 0.03165 |
| $a_5$ | 0.50115 | 0.45953 | 0.60562 | 0.42023 | 0.28902 | 0.18959 |

The drag coefficients for the airfoil at the different turbulence intensities in FIG. 3 are fitted to obtain the fitted drag coefficient model f'(x) with the angle of attack as the variable at the different turbulence intensities:

$$f'(x) = b_1 x^9 + b_2 x^8 + b_3 x^7 + b_4 x^6 + b_5 x^5 + b_6 x^4 + b_7 x^3 + b_8 x^2 + b_9 x + b_{10},$$

where $b_1$, $b_2$, $b_3$, $b_4$, $b_5$, $b_6$, $b_7$, $b_8$, $b_9$ and $b_{10}$ are a first fitting parameter, a second fitting parameter, a third fitting parameter, a fourth fitting parameter, a fifth fitting parameter, a sixth fitting parameter, a seventh fitting parameter, an eighth fitting parameter, a ninth fitting parameter and a tenth fitting parameter of the fitted drag coefficient model, respectively. Values of the fitting parameters of the fitted drag coefficient model are listed in Table 3.

TABLE 3

| | | | | | | |
|---|---|---|---|---|---|---|
| Fitting Parameters of Fitted Drag Coefficient Model | | | | | | |
| Turbulence Intensity | Uniform Flow | 2.3% | 4.6% | 8.5% | 11.0% | 13.0% |
| $a_1$ | $-7.20441 \times 10^{-11}$ | $-5.18678 \times 10^{-11}$ | $-1.15915 \times 10^{-11}$ | $-1.68066 \times 10^{-11}$ | $-2.81919 \times 10^{-11}$ | $-2.85261 \times 10^{-11}$ |
| $a_2$ | $3.56675 \times 10^{-9}$ | $2.77364 \times 10^{-9}$ | $1.00531 \times 10^{-9}$ | $1.10943 \times 10^{-9}$ | $1.56143 \times 10^{-9}$ | $1.53072 \times 10^{-9}$ |
| $a_3$ | $-4.08665 \times 10^{-8}$ | $-3.7343 \times 10^{-8}$ | $-2.33693 \times 10^{-8}$ | $-2.25584 \times 10^{-8}$ | $-2.55875 \times 10^{-8}$ | $-2.37604 \times 10^{-8}$ |
| $a_4$ | $-3.92801 \times 10^{-7}$ | $-2.34322 \times 10^{-7}$ | $5.91023 \times 10^{-8}$ | $6.98106 \times 10^{-8}$ | $7.08302 \times 10^{-9}$ | $-1.58158 \times 10^{-8}$ |
| $a_5$ | $7.13006 \times 10^{-6}$ | $6.08062 \times 10^{-6}$ | $2.42608 \times 10^{-6}$ | $1.96008 \times 10^{-6}$ | $2.72137 \times 10^{-6}$ | $2.71888 \times 10^{-6}$ |
| $a_6$ | $1.86516 \times 10^{-5}$ | $7.88763 \times 10^{-6}$ | $-3.59074 \times 10^{-6}$ | $-7.71146 \times 10^{-6}$ | $-8.76035 \times 10^{-6}$ | $-8.00161 \times 10^{-6}$ |
| $a_7$ | $-3.02957 \times 10^{-4}$ | $-2.66082 \times 10^{-4}$ | $-6.13672 \times 10^{-4}$ | $-2.17501 \times 10^{-5}$ | $-5.1131 \times 10^{-5}$ | $-6.76389 \times 10^{-5}$ |
| $a_8$ | $-3.22239 \times 10^{-4}$ | $-4.09807 \times 10^{-5}$ | $6.37493 \times 10^{-5}$ | $1.74942 \times 10^{-4}$ | $2.58347 \times 10^{-4}$ | $2.68227 \times 10^{-4}$ |
| $a_9$ | 0.0026 | 0.0032 | $9.65084 \times 10^{-4}$ | $3.70093 \times 10^{-6}$ | $-4.0211 \times 10^{-4}$ | $1.90884 \times 10^{-4}$ |
| $a_{10}$ | 0.00756 | 0.00335 | 0.00449 | 0.00274 | 0.00416 | 0.00149 |

Figure 5:
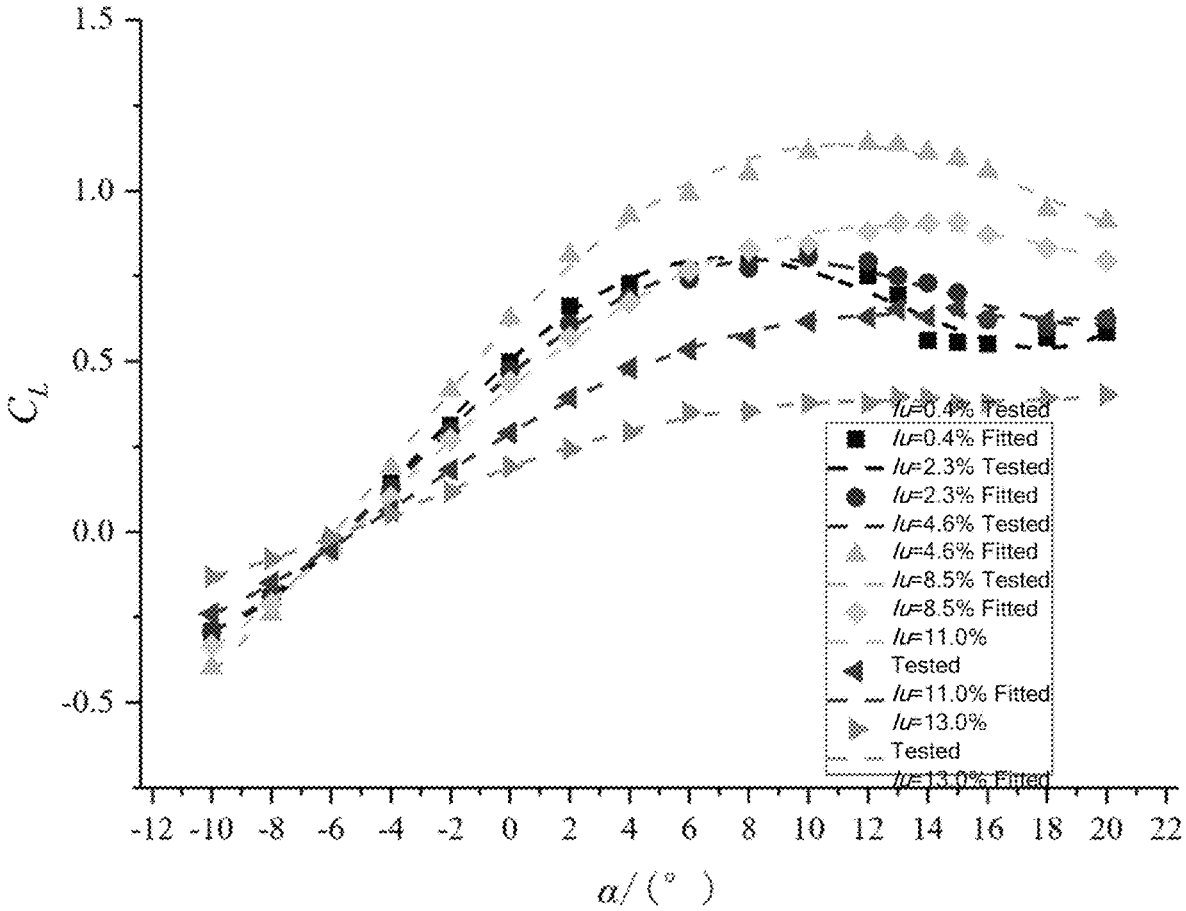
FIG. 5 is a chart of a fitted lift coefficient model according to an embodiment of the present disclosure.
Figure 6:
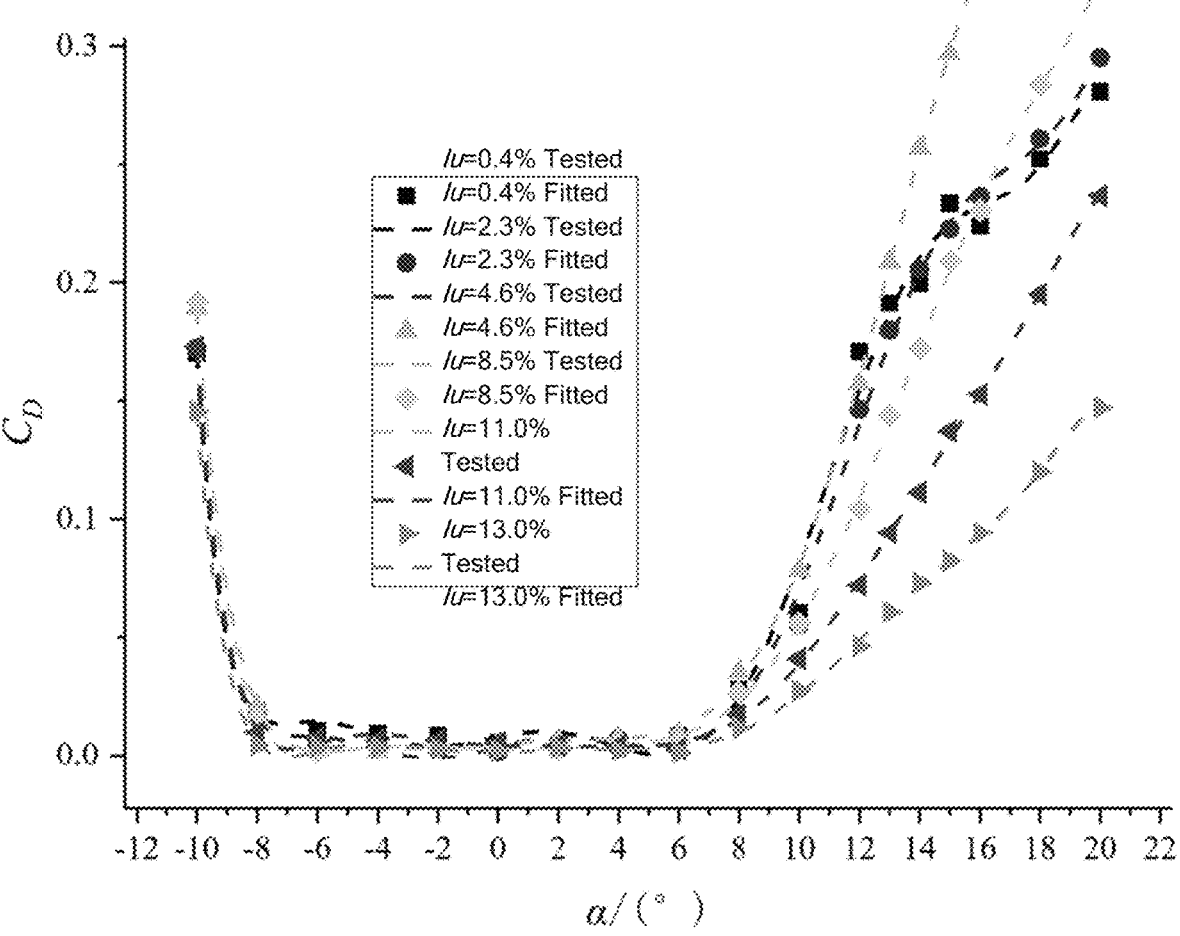
FIG. 6 is a chart of a fitted drag coefficient model according to an embodiment of the present disclosure.

The lift and drag coefficients for the airfoil at the different turbulence intensities can be obtained through a combination of Table 2 and Equation (3) and a combination of Table 3 and Equation (4), and the fitted results are as shown in FIG. 5 and FIG. 6, with small fitting errors and standard errors of all parameters being controlled below 1.5%.

In step 104, a turbulence intensity on a wind turbine to be measured is calculated according to a height at which the wind turbine to be measured is located.

The step 104 of calculating a turbulence intensity on the wind turbine to be measured according to the height at which the wind turbine to be measured is located specifically includes: calculating a turbulence intensity on the wind turbine to be measured according to the height at which the wind turbine to be measured is located by using an equation $I_z(z)=I_{10}I_z(x)$, where $I_z(z)$ denotes a turbulence intensity proportionality coefficient, $$I_z(z) = \left(\frac{z}{10}\right)^{-\alpha},$$

while z denotes the height at which the wind turbine is located, $\alpha$ denotes a ground roughness exponent, and $I_{10}$ denotes a nominal turbulence intensity at a height of 10 m.

In step 105, the lift coefficient and the drag coefficient for the airfoil of the wind turbine to be measured are obtained according to the turbulence intensity on the wind turbine to be measured by using the fitted lift coefficient model with the angle of attack as the variable and the fitted drag coefficient model with the angle of attack as the variable at the different turbulence intensities.

According to FIG. 5 and FIG. 6, the corresponding lift and drag coefficients for the airfoil at the different turbulence intensities can be obtained visually, and with reference to the parameters in Table 2 and Table 3, the lift and drag coefficients for the airfoil can be estimated.

A system for calculating aerodynamic force of a wind turbine airfoil under the different turbulence intensities includes a wind pressure measuring module, a lift coefficient and drag coefficient calculating module, a function fitting module, a turbulence intensity calculating module and a lift coefficient and drag coefficient fitting obtaining module.

The wind pressure measuring module is configured to measure wind pressure at each pressure measurement point on an airfoil surface of a wind turbine under the different turbulence intensities.

The lift coefficient and drag coefficient calculating module is configured to calculate a lift coefficient and a drag coefficient for the airfoil according to the wind pressure at each pressure measurement point on the airfoil surface and thus obtain lift coefficients and drag coefficients at the different turbulence intensities.

The lift coefficient and drag coefficient calculating module specifically includes: a wind pressure coefficient calculating submodule configured to calculate a wind pressure coefficient for each pressure measurement point on the airfoil surface according to the wind pressure at each pressure measurement point on the airfoil surface by using an equation $$C_{pi} = \frac{p_i - p_s}{p_i - p_s},$$

where $C_{pi}$ denotes the wind pressure coefficient for an ith pressure measurement point on the airfoil surface, $p_i$ denotes the wind pressure at the ith pressure measurement point on the airfoil surface, $p_s$ denotes static pressure, and $p_t$ denotes total wind pressure for all pressure measurement points on the airfoil surface; a lift coefficient calculating submodule configured to calculate the lift coefficient $C_L$ for the airfoil according to the wind pressure coefficient for each pressure measurement point on the airfoil surface by using an equation $$C_L = -\frac{\sum_1^{80} p_i L_i \sin\theta_i}{\frac{1}{2}\rho U_\infty^2 c} = -\sum_1^{80} Cp_i L_i \sin\theta_i / c,$$

where $L_i$ denotes an arc length represented by the ith pressure measurement point, $\theta_i$ denotes an included angle between a normal direction of the ith pressure measurement point and an inflow direction, $C_{pi}$ denotes the wind pressure coefficient for the ith pressure measurement point, c denotes a chord length of the airfoil, $\rho$ denotes air density, $$U_\infty^2$$

denotes a square of a velocity, and 80 is the total number of the pressure measurement points; and a drag coefficient calculating submodule configured to calculate the drag coefficient $C_D$ for the airfoil according to the wind pressure coefficient for each pressure measurement point on the airfoil surface by using an equation $$C_D = -\frac{\sum_1^{80} p_i L_i \cos\theta_i}{\frac{1}{2}\rho U_\infty^2 c} = -\sum_1^{80} Cp_i L_i \cos\theta_i / c.$$

The function fitting module is configured to perform function fitting on the lift coefficients and the drag coefficients at the different turbulence intensities, respectively, thereby obtaining a fitted lift coefficient model with an angle of attack as a variable and a fitted drag coefficient model with the angle of attack as a variable at the different turbulence intensities.

The function fitting module specifically includes: a fitted lift coefficient model obtaining module configured to perform function fitting on the lift coefficients at the different turbulence intensities to obtain the fitted lift coefficient model f(x) with the angle of attack as the variable at the different turbulence intensities: $f(x)=a_1 x^4+a_2 x^3+a_3 x^2+a_4 x+a_5$ where x denotes the angle of attack, and $a_1$, $a_2$, $a_3$, $a_4$ and $a_5$ are a first fitting parameter, a second fitting parameter, a third fitting parameter, a fourth fitting parameter and a fifth fitting parameter of the fitted lift coefficient model, respectively; and a fitted drag coefficient model obtaining module configured to perform function fitting on the drag coefficients at the different turbulence intensities to obtain the fitted drag coefficient model f'(x) with the angle of attack as the variable at the different turbulence intensities: $f'(x)=b_1 x^9+b_2 x^8+b_3 x^7+b_4 x^6+b_5 x^5+b_6 x^4+b_7 x^3+b_8 x^2+b_9 x+b_{10}$, where $b_1$, $b_2$, $b_3$, $b_4$, $b_5$, $b_6$, $b_7$, $b_8$, $b_9$ and $b_{10}$ are a first fitting parameter, a second fitting parameter, a third fitting parameter, a fourth fitting parameter, a fifth fitting parameter, a sixth fitting parameter, a seventh fitting parameter, an eighth fitting parameter, a ninth fitting parameter and a tenth fitting parameter of the fitted drag coefficient model, respectively.

The turbulence intensity calculating module is configured to calculate a turbulence intensity on a wind turbine to be measured according to a height at which the wind turbine to be measured is located.

The turbulence intensity calculating modules specifically includes: a turbulence intensity calculating submodule configured to calculate a turbulence intensity on the wind turbine to be measured according to the height at which the wind turbine to be measured is located by using an equation $I_z(z) = I_{10} \bar{I}_z(z)$, where $\bar{I}_z(z)$ denotes a turbulence intensity proportionality coefficient, $$\bar{I}_z(z) = \left(\frac{z}{10}\right)^{-\alpha},$$

while z denotes the height at which a wind turbine is located, $\alpha$ denotes a ground roughness exponent, and $I_{10}$ denotes a nominal turbulence intensity at a height of 10 m;

The lift coefficient and drag coefficient fitting obtaining module is configured to obtain the lift coefficient and the drag coefficient for the airfoil of the wind turbine to be measured according to the turbulence intensity on the wind turbine to be measured by using the fitted lift coefficient model with the angle of attack as the variable and the fitted drag coefficient model with the angle of attack as the variable at the different turbulence intensities.

In the present disclosure, the variation curves of lift and drag coefficients under actual different turbulence intensities are obtained by wind tunnel tests, and the test results are fitted by using a quartic polynomial and a ninth-order polynomial to derive corresponding calculation equations. Thus, the lift and drag coefficients for airfoils at the different turbulence intensities in actual engineering can be calculated for use in designing a wind turbine generator blade. When NREL S810 airfoil is used, data reference can be provided for blade design.

The embodiments are described herein in a progressive manner. Each embodiment focuses on the difference from another embodiment, and the same and similar parts between the embodiments may refer to each other.

The principles and implementations of the present disclosure are illustrated herein by using specific examples. The description of the above embodiments is merely intended to help understand the method provided in the present disclosure and core ideas thereof. The described embodiments are merely a part rather than all of the embodiments of the present disclosure, and all other embodiments derived from the embodiments of the present disclosure by a person of ordinary skill in the art without creative efforts shall fall within the scope of the present disclosure.

What is claimed is:

1. A method for calculating aerodynamic force of a wind turbine airfoil under different turbulence intensities, comprising:

measuring wind pressure at each pressure measurement point on an airfoil surface of a wind turbine under the different turbulence intensities;

calculating a lift coefficient and a drag coefficient for the airfoil according to the wind pressure at each pressure measurement point on the airfoil surface and thus obtaining lift coefficients and drag coefficients at the different turbulence intensities;

performing function fitting on the lift coefficients and the drag coefficients at the different turbulence intensities, respectively, to obtain a fitted lift coefficient model with an angle of attack as a variable and a fitted drag coefficient model with the angle of attack as a variable at the different turbulence intensities, wherein the performing the function fitting comprises:

performing function fitting on the lift coefficients at the different turbulence intensities to obtain the fitted lift coefficient model f(x) with the angle of attack as the variable at the different turbulence intensities:

$$f(x) = a_1 x^4 + a_2 x^3 + a_3 x^2 + a_4 x + a_5,$$

wherein x denotes the angle of attack, and $\alpha_1$, $\alpha_2$, $\alpha_3$, $\alpha_4$ and $\alpha_5$ are a first fitting parameter, a second fitting parameter, a third fitting parameter, a fourth fitting parameter and a fifth fitting parameter of the fitted lift coefficient model, respectively; and performing function fitting on the drag coefficients at the different turbulence intensities to obtain the fitted drag coefficient model f(x) with the angle of attack as the variable at the different turbulence intensities:

$$f'(x) = b_1 x^9 + b_2 x^8 + b_3 x^7 + b_4 x^6 + b_5 x^5 + b_6 x^4 + b_7 x^3 + b_8 x^2 + b_9 x + b_{10},$$

wherein $b_1$, $b_2$, $b_3$, $b_4$, $b_5$, $b_6$, $b_7$, $b_8$, $b_9$ and $b_{10}$ are a first fitting parameter, a second fitting parameter, a third fitting parameter, a fourth fitting parameter, a fifth fitting parameter, a sixth fitting parameter, a seventh fitting parameter, an eighth fitting parameter, a ninth fitting parameter and a tenth fitting parameter of the fitted drag coefficient model, respectively;

calculating a turbulence intensity on the wind turbine to be measured according to a height at which the wind turbine to be measured is located;

obtaining the lift coefficient and the drag coefficient for the airfoil of the wind turbine to be measured according to the turbulence intensity on the wind turbine to be measured by using the fitted lift coefficient model with the angle of attack as the variable and the fitted drag coefficient model with the angle of attack as the variable at the different turbulence intensities; and adjusting the airfoil of the wind turbine to be measured according to the lift coefficient obtained and the drag coefficient obtained.

2. The method for calculating aerodynamic force of the wind turbine airfoil under the different turbulence intensities according to claim 1, wherein calculating the lift coefficient and the drag coefficient for the airfoil according to the wind pressure at each pressure measurement point on the airfoil surface and thus obtaining lift coefficients and drag coefficients at the different turbulence intensities comprises:

calculating a wind pressure coefficient for each pressure measurement point on the airfoil surface according to the wind pressure at each pressure measurement point on the airfoil surface by using an equation $$C_{pi} = \frac{p_i - p_s}{p_i - p_s},$$

wherein $C_{pi}$ denotes the wind pressure coefficient for an ith pressure measurement point on the airfoil surface, while $p_i$ denotes the wind pressure at the ith pressure measurement point on the airfoil surface, $p_s$ denotes static pressure, and $p_t$ denotes total wind pressure for all pressure measurement points on the airfoil surface;

calculating the lift coefficient $C_L$ for the airfoil according to the wind pressure coefficient for each pressure measurement point on the airfoil surface by using an equation $$C_L = -\frac{\sum_1^{80} p_i L_i \sin\theta_i}{\frac{1}{2}\rho U_\infty^2 c} = -\sum_1^{80} Cp_i L_i \sin\theta_i / c,$$

wherein $L_i$ denotes an arc length represented by the ith pressure measurement point, $\theta_i$ denotes an included angle between a normal direction of the ith pressure measurement point and an inflow direction, $C_{pi}$ denotes the wind pressure coefficient for the ith pressure measurement point on the airfoil surface, c denotes a chord length of the airfoil, $\rho$ denotes air density, and $$U_\infty^2$$

denotes a square of a velocity, and 80 is a total number of the pressure measurement points; and calculating the drag coefficient $C_D$ for the airfoil according to the wind pressure coefficient for each pressure measurement point on the airfoil surface by using an equation $$C_D = -\frac{\sum_1^{80} p_i L_i \cos\theta_i}{\frac{1}{2}\rho U_\infty^2 c} = -\sum_1^{80} Cp_i L_i \cos\theta_i / c.$$

3. The method for calculating aerodynamic force of the wind turbine airfoil under the different turbulence intensities according to claim 1, wherein calculating the turbulence intensity on the wind turbine to be measured according to the height at which the wind turbine to be measured is located, comprises:

calculating a turbulence intensity $I_z(z)$ on the wind turbine to be measured according to the height at which the wind turbine to be measured is located by using an equation $I_z(z) = I_{10}\bar{I}_z(z)$, wherein $\bar{I}_z(z)$ denotes a turbulence intensity proportionality coefficient, $$\bar{I}_z(z) = \left(\frac{z}{10}\right)^{-\alpha},$$

while z denotes the height at which the wind turbine is located, $\alpha$ denotes a ground roughness exponent, and $I_{10}$ denotes a nominal turbulence intensity at a height of 10 m.

* * * * *